United States Patent
Marshall et al.

(10) Patent No.: US 11,874,288 B1
(45) Date of Patent: Jan. 16, 2024

(54) UTILIZING WELL PLATES WITH EMBEDDED ARTIFACTS

(71) Applicant: Redshift Bioanalytics, Inc., Burlington, MA (US)

(72) Inventors: Charles McAlister Marshall, North Andover, MA (US); Richard C. Sharp, Wayland, MA (US); Frederick Milton Blodgett, Jr., Southbridge, MA (US); Vlorent Morina, San Jose, CA (US); Jerry E. Hurst, Jr., Boulder Creek, CA (US)

(73) Assignee: RedShift BioAnalytics Inc., Burlington, MA (US)

( * ) Notice: Subject to any disclaimer, the term of this patent is extended or adjusted under 35 U.S.C. 154(b) by 498 days.

(21) Appl. No.: 16/247,925

(22) Filed: Jan. 15, 2019

Related U.S. Application Data

(60) Provisional application No. 62/617,758, filed on Jan. 16, 2018, provisional application No. 62/617,835, filed on Jan. 16, 2018.

(51) Int. Cl.
*B01L 3/00* (2006.01)
*G01N 35/00* (2006.01)
*B01L 7/00* (2006.01)
*B01L 5/00* (2006.01)
*B01L 1/02* (2006.01)

(52) U.S. Cl.
CPC .......... *G01N 35/00732* (2013.01); *B01L 1/02* (2013.01); *B01L 3/50851* (2013.01);
(Continued)

(58) Field of Classification Search
CPC ................... B01L 3/502; B01L 3/5085; B01L 2300/0829; B01L 3/50853;
(Continued)

(56) References Cited

U.S. PATENT DOCUMENTS

| | | | | |
|---|---|---|---|---|
| 5,741,463 A | * | 4/1998 | Sanadi | B01L 3/5025 422/527 |
| 6,340,589 B1 | * | 1/2002 | Turner | B29C 45/16 422/534 |

(Continued)

OTHER PUBLICATIONS

Biocision, "Thermo-conductive microplate, tissue culture plate and reservoir modules", 2017.

(Continued)

*Primary Examiner* — Jill A Warden
*Assistant Examiner* — Dwayne K Handy
(74) *Attorney, Agent, or Firm* — Nutter McClennen & Fish LLP

(57) ABSTRACT

A well plate includes a frame section that defines a plane, and a plurality of well structures. Each well structure extends in a direction away from the plane defined by the frame section, and each well structure defines a well for holding a fluid. The well plate further includes an artifact connected to at least one well structure. The artifact uniquely identifies a type of the well plate among other types of well plates. Along these lines, a result of a well plate type identification operation, which indicates whether the well plate includes the artifact, may determine whether a predefined pressure is applied to the well plate to facilitate fluid sampling in response to the result, whether fluid level sensing can be performed to gauge amounts of fluids drawn from the wells and/or identify how much fluid is left in the wells, etc.

18 Claims, 8 Drawing Sheets

(52) U.S. Cl.
CPC ........... *B01L 3/50853* (2013.01); *B01L 3/565* (2013.01); *B01L 5/00* (2013.01); *B01L 7/54* (2013.01); *B01L 2200/146* (2013.01); *B01L 2300/048* (2013.01); *B01L 2300/0663* (2013.01); *B01L 2300/0829* (2013.01); *B01L 2300/0861* (2013.01); *B01L 2300/14* (2013.01); *B01L 2300/16* (2013.01); *B01L 2300/1805* (2013.01); *B01L 2300/1833* (2013.01)

(58) Field of Classification Search
CPC ..... B01L 2300/0848; B01L 2300/0858; G01N 35/00732
See application file for complete search history.

(56) References Cited

U.S. PATENT DOCUMENTS

| | | | |
|---|---|---|---|
| 9,377,400 B2 | 6/2016 | Wagner et al. | |
| 9,625,378 B2 | 4/2017 | Marshall et al. | |
| 9,778,167 B2 | 10/2017 | Wagner et al. | |
| 2002/0055187 A1* | 5/2002 | Treptow | B01L 7/00 436/518 |
| 2007/0202538 A1* | 8/2007 | Glezer | G01N 33/54366 435/7.1 |
| 2008/0026483 A1 | 1/2008 | Oldenburg | |
| 2010/0297707 A1* | 11/2010 | Lee | B01L 7/52 435/91.2 |
| 2011/0183312 A1* | 7/2011 | Huang | C12M 23/12 435/3 |
| 2018/0059005 A1 | 3/2018 | Marshall et al. | |

OTHER PUBLICATIONS

Thermo Fisher Scientific Inc., "Thermo Scientific Microplates Guide", 2014.

\* cited by examiner

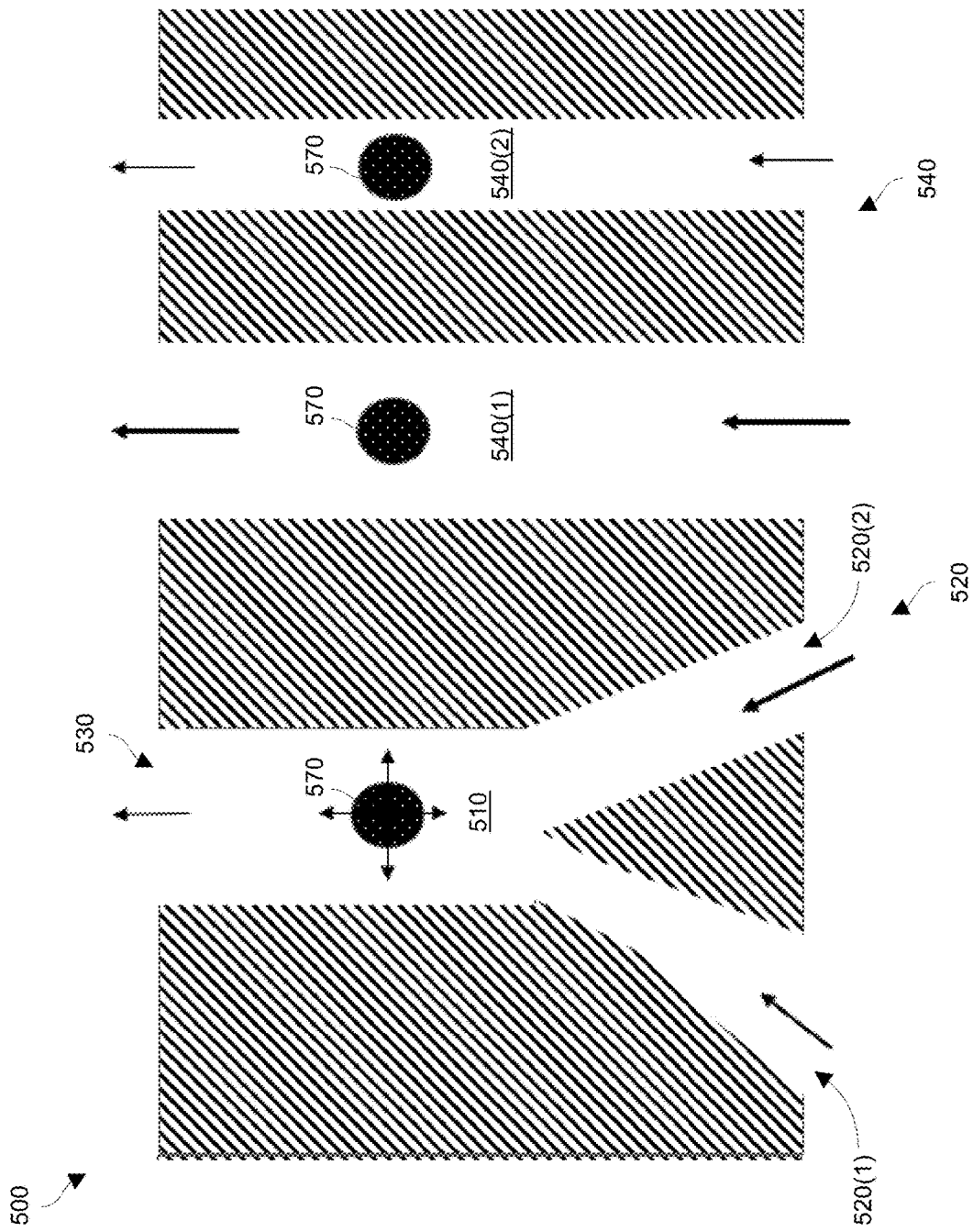

UTILIZING WELL PLATES WITH EMBEDDED ARTIFACTS

BACKGROUND

The use of microplates (or well plates) is common in analytical research and experimentation. Such microplates provide wells to hold small amounts of liquid for evaluation.

While in use, such microplates may be exposed to changes in temperature (e.g., for low temperature storage). Along these lines, to stabilize or treat liquid samples held by a microplate with relatively shallow wells, the bottom surface of the microplate may be placed in contact with a thermal plate that cools the liquid samples via thermal conduction through the microplate. Additionally, to stabilize or treat liquid samples held by a microplate with relatively deep wells, cold gases or fluids may be circulated against the underside of the microplate to cool the liquid samples again via thermal conduction through the microplate.

SUMMARY

Unfortunately, there are deficiencies to the above-described conventional microplates. For example, a microplate with relatively shallow wells is poorly suited for use in certain types of systems such as fluid modulation systems that require each well to hold enough fluid to provide multiple samples for interrogation. Additionally, a microplate with relatively deep wells is typically thin to enable effective thermal conduction but is thus poorly suited (e.g., too fragile) for applications that may use pressure when sampling from the microplate.

Improved techniques are directed to using well plates with embedded artifacts that enable instrumentation to identify that the well plates are of a particular type among other well plate types. Such identification informs the instrumentation that the well plates may be involved in certain types of processes that could damage or generate inaccurate measurements with other well plate types, such as well pressurization to facilitate drawing of fluid from the wells, fluid level sensing to gauge the amounts of fluids drawn from the wells and/or identify how much fluid is left in the wells, and so on.

One embodiment is directed to a well plate which includes a frame section that defines a plane, and a plurality of well structures. Each well structure extends in a direction away from the plane defined by the frame section, and each well structure defines a well for holding a fluid. The well plate further includes an artifact connected to at least one well structure. The artifact uniquely identifies a type of well plate among other types of well plates.

In accordance with certain embodiments, the well plate has a sampling side and a back side. Additionally, the well defined by each well structure is inaccessible from the back side. However, the well defined by each well structure is accessible from the sampling side through a respective opening in the frame section to enable instrumentation to access that well.

In accordance with certain embodiments, the artifact includes a set of channel walls that defines a set of inter-well channels (or passages) that connects at least two wells. The presence of the set of inter-well channels indicates to the instrumentation that the well plate has a particular geometry that is different from other geometries of other well plates that are processable by the instrumentation. The artifact or in this embodiment the passages may indicate certain other information about the well plate other than geometry, including pressure limits, identification of fluid volume remaining, dead volumes (i.e. unusable fluid), useable temperature range, place or time of manufacture, well plate material, fluid compatibility, usage history, or other important characteristics associated with the well plate or the fluidic system where it is used.

In accordance with certain embodiments, the artifact includes sample material residing in a set of wells defined by a set of well structures. The presence of the sample material residing in the set of wells indicates that the well plate has a particular geometry that is different from other geometries of other well plates that are processable by the instrumentation.

In accordance with certain embodiments, the well plate further includes conductive material in contact with a set of well structures. Such conductive material enables the instrumentation to perform fluid level sensing of the fluid filling the set of wells to the unique set of fluid heights.

In accordance with certain embodiments, a particular well defined by a particular well structure includes (i) a first section having a first diameter and (ii) a second section having a second diameter that is narrower than the first diameter. When the particular well contains fluid, the fluid height changes at a first rate within the first section when the instrumentation draws fluid from the particular well at a constant speed and at a second rate that is faster than the first rate when the instrumentation draws fluid from the well at the constant speed. Such features enable the instrumentation to more easily perform fluid level sensing.

In accordance with certain embodiments, the well plate further includes a set of containing walls coupled with the frame section. The set of contain walls defines a well plate bottom and a containing space between the plurality of well structures and the well plate bottom. Here, thermally conductive material may be disposed within the containing space defined by the set of containing walls, the thermally conductive material being constructed and arranged (or operative) to transfer heat between the plurality of well structures and the well plate bottom defined by the set of containing walls.

In accordance with certain embodiments, the plurality of well structures defines a set of recesses to receive, on the back side of the well plate, a set of extending members of a thermal control apparatus. Such extending members (e.g., thermal conduits, heat pipes, cast material that provides thermal mass, etc.) facilitate temperature transfer through the well plate to fluid within the wells.

In accordance with certain embodiments, the frame section includes a planar portion that couples with the plurality of well structures, and a set of ridge portions coupled with the planar portion. The set of ridge portions enable effective formation of a pressure seal with a gasket of the instrumentation.

Another embodiment is directed to a method of well plate processing. The method includes:
 (A) performing a well plate type identification operation on a well plate having (i) a frame section that defines a plane and (ii) a plurality of well structures, each well structure extending in a direction away from the plane defined by the frame section, and each well structure defining a well for holding a fluid, a result of the well plate type identification operation indicating whether the well plate further includes an artifact connected to at least one well structure of the well plate;
 (B) when the result of the well plate type identification operation indicates that the well plate includes the artifact, applying a predefined pressure to the well plate to facilitate fluid sampling in response to the result; and (C) when the result of the well plate type identification operation indicates that the well plate does not include the artifact, preventing the predefined pressure from being applied to the well plate to prevent damaging the well plate in response to the result.

In some arrangements, the result of the well plate type identification operation indicates that the well plate includes the artifact, and the predefined pressure is applied to the well plate to facilitate fluid sampling in response to the result. Additionally, the method further includes:

(A) performing another well plate type identification operation on another well plate, a result of the other well plate type identification operation indicating whether the well plate further includes an artifact connected to at least one well structure of the other well plate, and (B) in response to the result of the other well plate type identification operation indicating that the other well plate does not includes an artifact, preventing the predefined pressure from being applied to the other well plate to prevent damaging the other well plate.

Other embodiments are directed to systems, apparatus, circuitry, computer program products, and so on which are involved in well plate processing. Some embodiments are directed to various methods, components and articles of manufacture which are involved in well plate processing.

This summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 8 is a cross-sectional side view of an example cell in accordance with certain embodiments.

DETAILED DESCRIPTION

An improved technique is directed to utilizing well plates with embedded artifacts to enable instrumentation (e.g., an electronic controller) to identify that the well plates are of a particular type among other well plate types. Such identification informs the instrumentation that the well plates may be involved in certain types of processes that are unsuitable for the other well plate types such as well pressurization to facilitate removal of fluid from the wells, fluid level sensing to gauge the amounts of fluids drawn from the wells and/or identify how much fluid is left in the wells, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
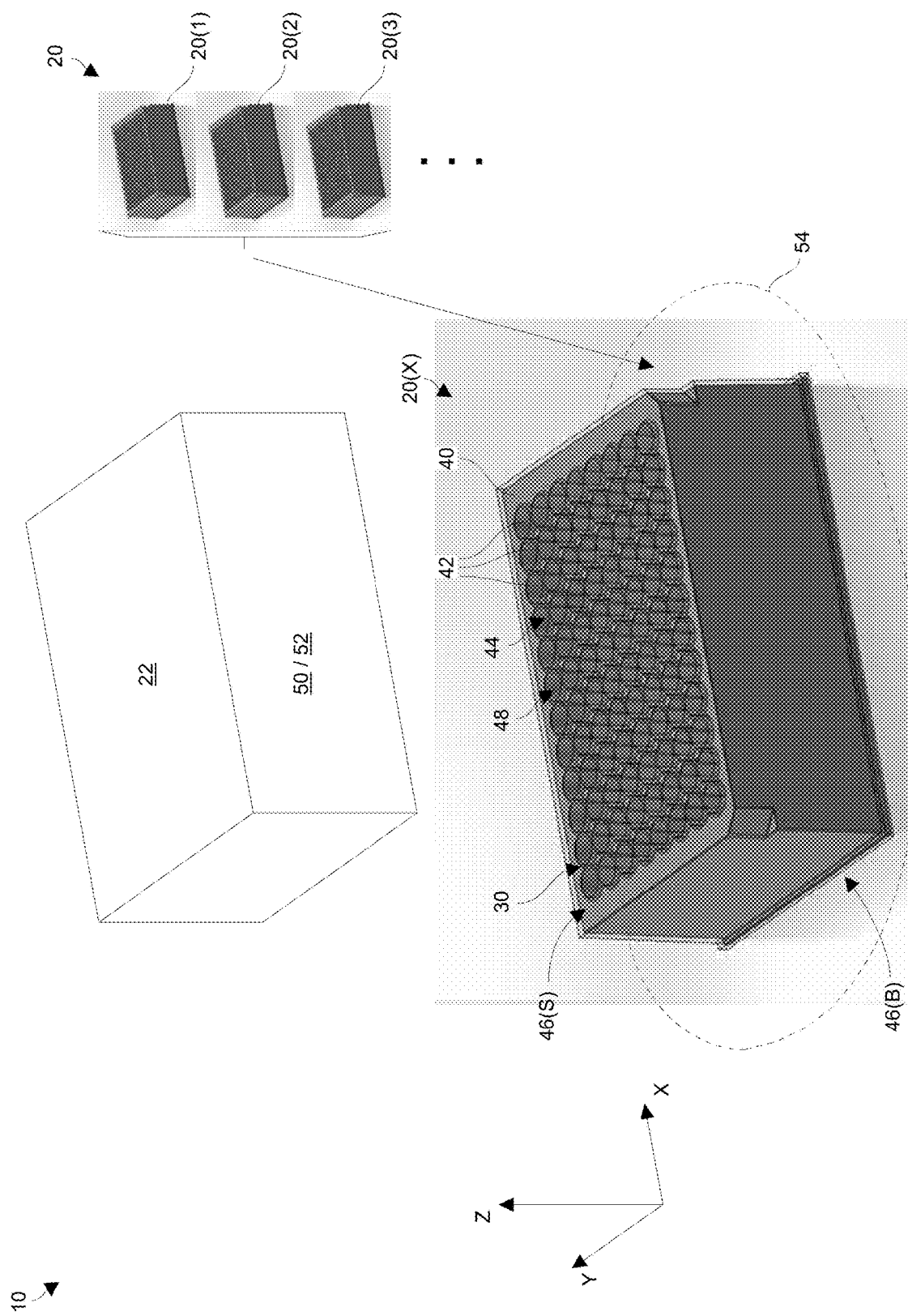
FIG. 1 is a perspective view of an environment in which well plates with embedded artifacts are utilized to enable instrumentation to identify that the well plates are of a particular type among other well plate types.

FIG. 1 is a perspective view of an environment 10 which includes well plates 20(1), 20(2), 20(3), . . . 20(X), . . . (collectively, well plates 20) and instrumentation 22 that processes the well plates 20. As will be explained in further detail shortly, one or more of the well plates 20 include an artifact 30 that enables the instrumentation 22 to identify those well plates 20 as being of a particular type among other well plate types (e.g., see the well plate 20(X)). Such an artifact 30 identifies that well plate 20 as being of a unique type thus signaling to the instrumentation 22 that the well plate 20 is suitable for use for certain processes vis-à-vis other types of well plates 20 that are unsuitable or poorly suited for those processes. Such artifacts may also indicate calibration factors that may be used to identify such important features as useable fluid volume of wells in the well plate and dead volumes.

Each well plate 20 includes a frame section 40 and multiple well structures 42. The frame section 40 defines a plane (e.g., the X-Y plane in FIG. 1) and connects (or integrates) the well structures 42 together. Each well structure 42 extends in a direction away from the plane defined by the frame section 40 (e.g., in the negative Z-direction in FIG. 1), and defines a well 44 for holding a fluid. Together, the frame section 40 and the well structures 42 form a unified assembly (or article) for holding fluids (or other materials) for interrogation by the instrumentation 22. In some arrangements, the frame section 40 and the well structures 42 are tightly and contiguously integrated such that there are no discernable boundaries between the frame section 40 and the well structures 42.

It should be understood that each well plate 20 has a sampling side 46(S) and a back side 46(B). The wells 44 defined by the well structures 42 are inaccessible from the back side 46(B) (e.g., due to sealed bottoms). However, the wells 44 defined by the well structures 42 are accessible from the sampling side 46(S) through respective openings 48 in the frame section 40 thereby enabling the instrumentation 22 to access the wells 44. In some arrangements, the well structures 42 are arranged in an array (e.g., rows and columns) for efficient and effective well navigation.

The instrumentation 22 is constructed and arranged to process the well plates 20 and/or their contents. To this end, the instrumentation 22 includes a well plate interface (or sampling head) 50 and electronic control circuitry 52 coupled with the well plate interface 50. The well plate interface 50 interfaces with the well plates 20, and the electronic control circuitry 52 performs a set of operations on the well plates 20 and/or the materials contained by the well plates 20.

For the instrumentation 22 to process the well plates 20, the well plates 20 may be placed in a predefined test location 54. In some arrangements, the well plates 20 are placed at the location 54 one by one for processing. In other arrangements, the well plates 20 are placed at the location 54 in groups. Such placement may be performed by a human, robotics, combinations thereof, etc.

During operation, the instrumentation 22 performs a well plate type identification operation on a well plate 20. In particular, the instrumentation 22 scans for the artifact 30. In some arrangements, the artifact 30 includes walls that define a pattern of channels that connect particular wells 44. In other arrangements, the artifact 30 includes conductive material in particular wells 44. In yet other arrangements, the artifact 30 includes material filling particular wells 44 to predefined fluid heights. Such artifacts 30 are detectable by the instrumentation 22 and may be combined and/or replaced with other artifacts 30 to identify particular types and/or subtypes of well plates 20.

In response to the result of the well plate type identification operation performed on the well plate 20, the instrumentation 22 performs or prevents performance of certain activities. Such activities may include applying pressure to one or more wells 44, applying an electric signal to one or more wells, combinations thereof, and so on.

For example, suppose that the artifact 30 indicates to the instrumentation 22 that the well plate 20 is of the type that is suitable for well pressurization to facilitate fluid sampling. In such a situation, upon detection of the artifact 30, the instrumentation 22 may apply a predefined amount of pressure to one or more of the wells 44 while extracting fluid from the wells 44 to facilitate fluid removal.

However, if the result of the well plate type identification operation does not discover the artifact 30, the instrumentation 22 does not apply the predefined amount of pressure. Here, the well plate 20 may be unsuitable for pressurization, and the well plate 20 is prevented from being damaged. Further details will now be provided with reference to FIG. 2.

Figure 2:
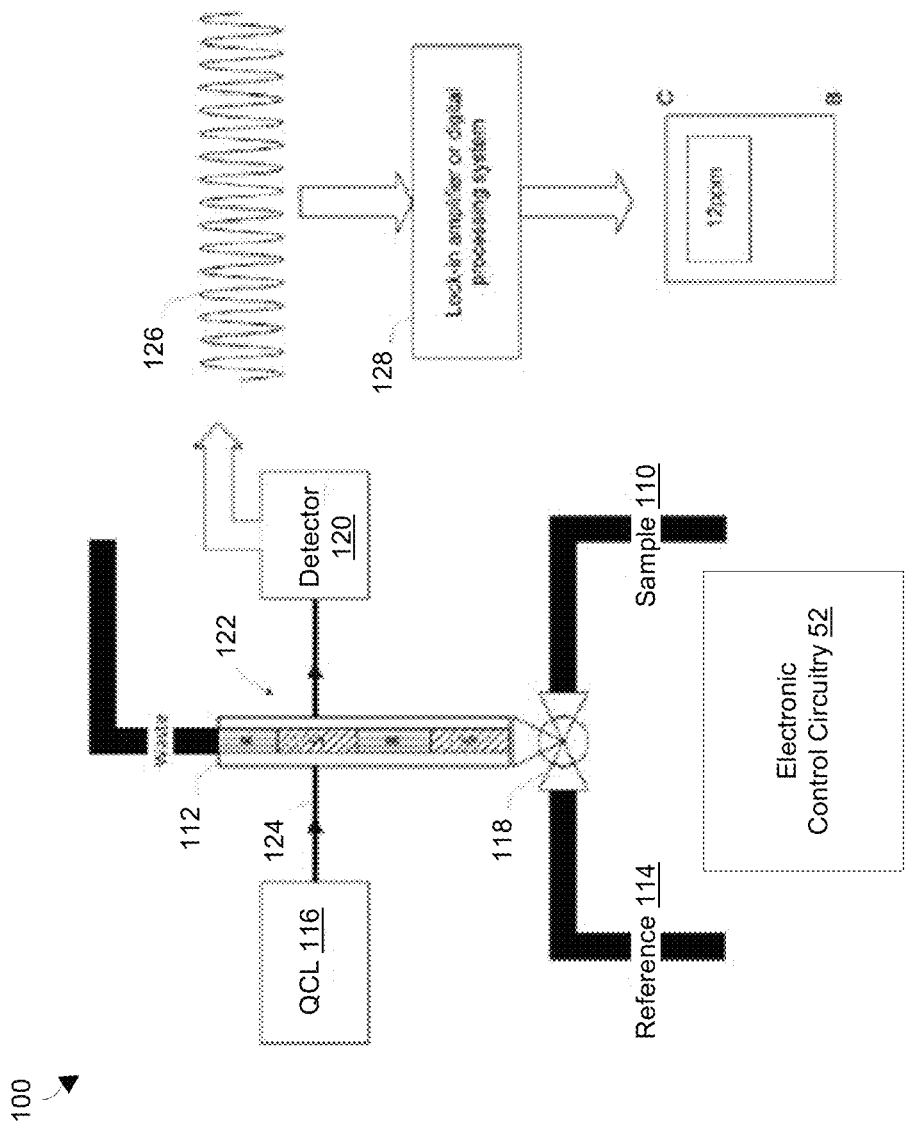
FIG. 2 is a block diagram of a fluid modulation system which is suitable for use as a portion of the instrumentation in accordance with certain embodiments.

FIG. 2 shows a fluid modulation system 100 which is suitable for use as a portion of the instrumentation 22 in accordance with certain embodiments. The fluid modulation system 100 includes serial and parallel streaming fluid flows through an interrogation region as means to compare two fluids and characterize an analyte therein. Various methods may be employed to enter fluids into a measurement cell, optimize the operating characteristics of the system, and position the interrogation region within the cell.

As shown in FIG. 2, a liquid sample solution 110 containing an analyte of interest is introduced into a fluid flow cell (or "flow cell") 112 in either a continuous flowing stream, or in a flow-stop-measure-start-flow repeating sequence. In the flowing stream, a reference solution 114 (the order of sample and reference can be reversed) is introduced into the flow stream in such a manner as to create alternating segments in the flow stream of sample 110 and reference 114 materials. These alternating segments are shown as S for sample and R for reference. The sample and reference may be extracted from two wells in a microwell plate as known in the art. A Mid-IR source 116, such as a fixed frequency or tunable QCL laser 116 as shown, or one or more lasers, is tuned to a suitable wavelength for measuring the analyte(s) of interest, such as the peak of an absorbance feature chosen to minimize background interferences. The reference material is chosen as a suitable blank, such as pure solvent, a gas, or a suitable reference material or mixture representative of the sample background. The reference may be inserted into the sample stream using microfluidic techniques such as valves, mixers, pumps, or the use of pressure to alternate the sample and reference streams, all as known in the art. In the illustrated example a switching valve 118 is employed. This application is directed at inventions for well plates and fluid extraction for use in such a liquid sensing system but are also applicable to other liquid characterization that use well plates or similar vials for containing fluids, and the techniques for fluid sensing and extraction.

It should be understood that the fluid modulation system 100 was described above as having the ability to use the well plates 20 disclosed herein by way of example only. Other systems may use the well plates 20 as well. Further details will now be provided with reference to FIGS. 3 and 4.

Figure 3:
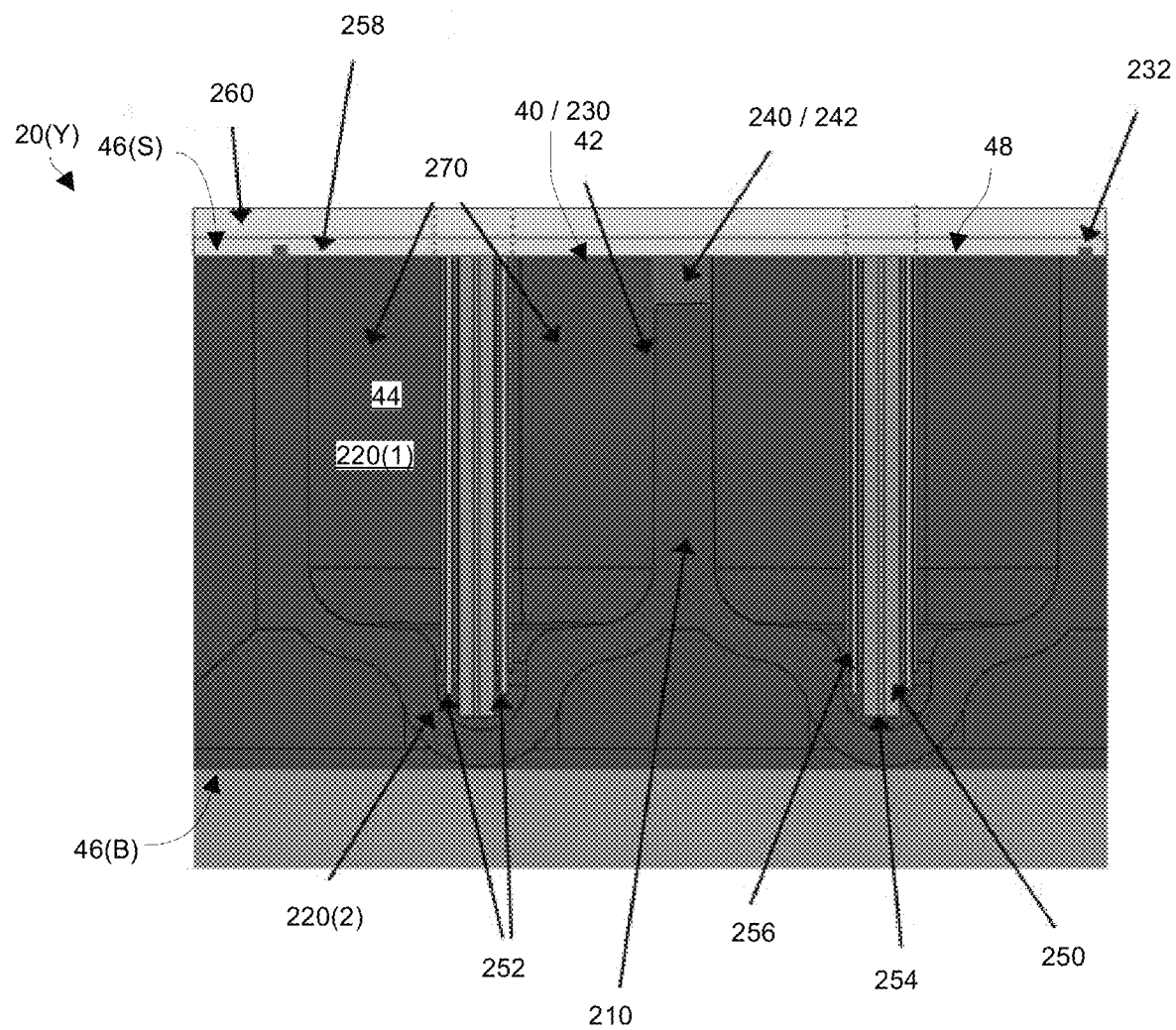
FIG. 3 is a detailed cross-sectional view of a portion of an example well plate showing particular well features in accordance with certain embodiments.
Figure 4:
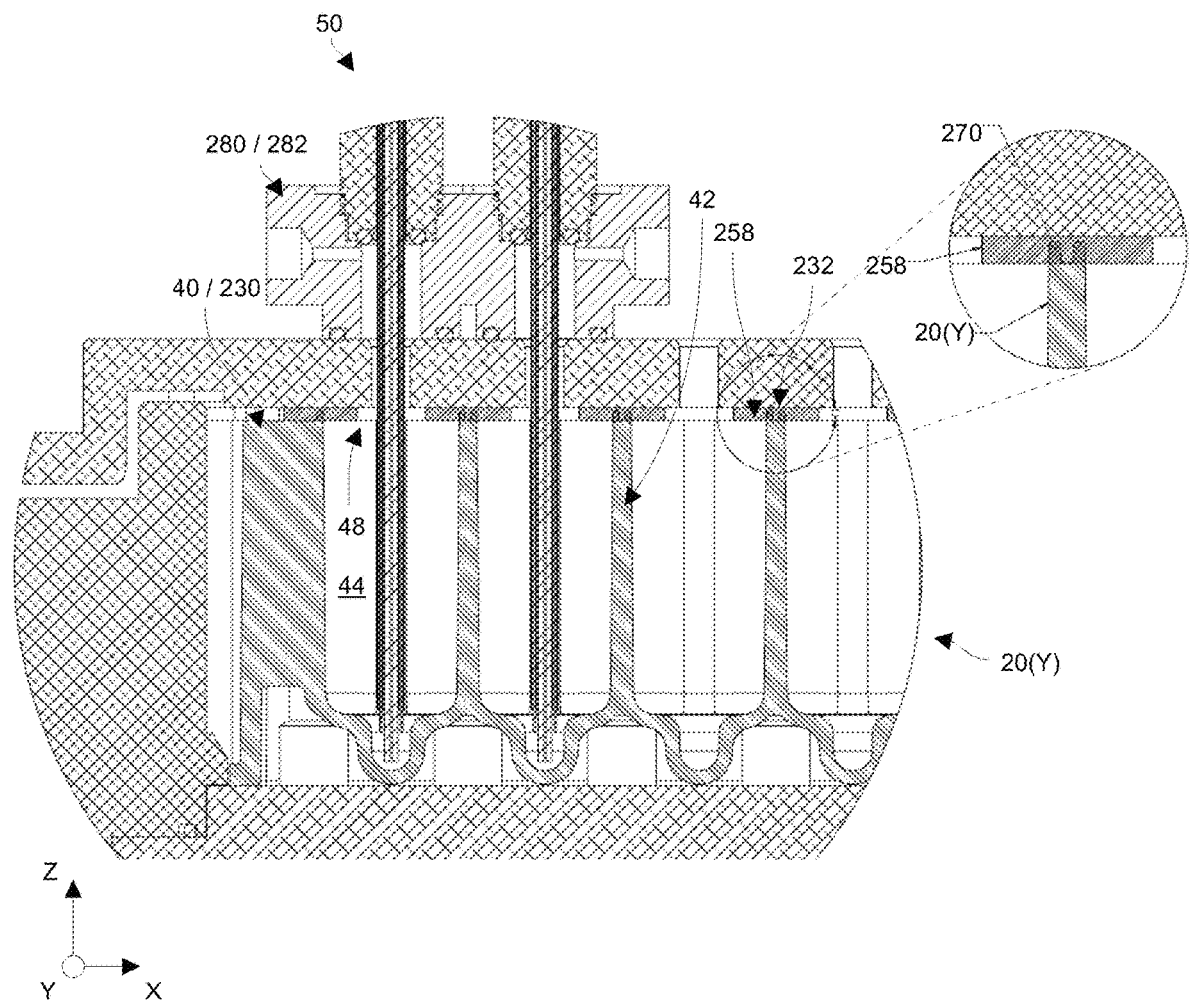
FIG. 4 is another detailed cross-sectional view of the example well plate of FIG. 3 showing particular pressure-related features in accordance with certain embodiments.

FIGS. 3 and 4 show particular details of an example well plate 20(Y). FIG. 3 shows a cross-section of a portion of the example well plate 20(Y) in accordance with certain embodiments. FIG. 4 further shows particular pressurization details for the example well plate 20(Y) in accordance with certain embodiments. As shown in FIGS. 3 and 4, the well structures 42 extend in a parallel manner in the same direction (e.g., the negative Z-direction in FIGS. 3 and 4) from the frame section 40.

In addition to including the frame section 40 and the well structures 42, the well plate 20(Y) further includes a set of inter-well barriers 210 (FIG. 3) that connect one or more well structures 42. Each inter-well barrier 210 provides additional support and/or strength to well structures 42 (e.g., to withstand the application of pressure to the well structures 42, etc.). The interior surface of the well structures within the wells 44 may have a hydrophilic coating to reduce fluid meniscus effects within the wells that may interfere with instrumentation 22 operation, or other coatings to achieve a desired interaction between fluid and well 44 material in contact with fluid.

Additionally, each well structure 42 defines well sections 220 having different diameters (FIG. 3). Along these lines, each well structure 42 defines a section 220(1) having a first diameter and a section 220(2) having a second diameter that is narrower that the first diameter. In some arrangements, the section 220(2) is dimple-shaped and tapers until the bottom of the well 44 is reached.

Furthermore, the frame section 40 of the well plate 20(Y) includes a planar portion 230 and a set of ridge portions 232. The planar portion 230 couples with the well structures 42 to hold the well structures 42 together (e.g., in an array formation). The set of ridge portions 232 couple with the planar portion 230 for pressure sealing purposes. In accordance with some arrangements, a ridge portion 232 may encircle one or more well openings 48 defined by the frame section 40. Accordingly, some openings 48 may not be separated by a ridge portion 232 and some openings 48 may be separated by a ridge portion 232.

In accordance with certain embodiments, the well plate 20(Y) further includes a set of walls 240 that define a set of channels 242. Each channel 242 may connect a pair of wells 44 thus enabling pressure within the pair of wells 44 to equalize. In some arrangements, the well plate 20(Y) has a pattern of channels 242 connected to more than two wells 44, or different pairs of wells.

As further shown in FIG. 3, the well plate interface 50 of the instrumentation 22 (also see FIG. 1) includes a hollow needle 250 and a set of electrically conductive leads 252. The hollow needle 250 defines a fluidic path (or channel) 254 that enables fluid to be conducted out of the well 44. The conductive leads 252, which have a covering 256 (e.g., plastic extrusion) so that only a certain conductive regions (e.g. the ends) are exposed, enable the instrumentation 22 to sense changes in conductivity.

The well plate interface 50 further includes a pressure gasket 258 and a sealing plate 260 that, when the well plate interface 50 is engaged with the well plate 20(Y), extends over at least some of the well openings 48 to enable the instrumentation 22 to modify the pressure within the respective wells 44. During such engagement, the ridge portions 232 advantageously facilitate compression of the gasket 258 by the sealing plate 260 around the openings 48 to facilitate sealing, e.g., see the region 270 in the inset of FIG. 4.

One should appreciate that the set of ridge portions 232 enable the well plate interface 50 to form a seal of the well plate 20 to the gasket 258. That is, in accordance with certain embodiments, the pressure compatibility is a combination of set of ridge portions 232, the rigidity of the top surface, and the rigidity of the wells 44 themselves.

As best seen in FIG. 4, when the well plate interface 50 has engaged with the well plate 20 to form effective seals, pressure-related equipment 280 (e.g., pressure sources, tubing, valves, sensors, etc.) of the instrumentation 22 may operate to provide pressure changes within the wells 44 to detect whether the artifact 30 is present as well as facilitate removal of sample material from the well 44. To this end, the pressure-related equipment 280 includes a paired manifold assembly 282 that is constructed and arranged to control and/or sense pressure within particular wells 44. The manifold assembly 282 includes gas line ports that run along the sides of the needles 250 and leads 252 to enable pressure modification and pressure sensing of the wells 44 through the well openings 48. Further details of these pressure-related features will be provided shortly.

Prior to forming seals between the well plate interface 50 and the well plate 20, one or more needles 250 and electrically conductive leads 252 of the well plate interface 50 enter the outer portions 270 of the wells 44 through the well openings 48. In accordance with some arrangements, as the well plate interface 50 continues moving, the instrumentation 22 detects the heights of the fluid within the wells 44 based on changes in conductivity as sensed by the conductive leads 252.

Eventually, the needles 250 and the conductive leads 252 of the well plate interface 50 fully enter the wells 44 until the ends of the needles 250 and the conductive leads 252 reside within the sections 220(2) (e.g., see FIG. 3), and the manifold seals to 260. At this point, the instrumentation 22 may apply pressure to the wells 44 to facilitate fluid removal from the wells 44.

It should be understood that, as a needle 250 draws fluid from a well 44 at a constant speed (or rate), the fluid height within the well 44 changes at a first rate within the section 220(1) and at a second rate within the section 220(2). In particular, the fluid height decreases at a faster rate within the section 220(2) where the conductive leads 252 reside. Accordingly, fluid height detection may be more effective within the section 220(2) as the fluid height moves closer to the end of the needle 250 thus enabling the instrumentation 22 to terminate fluid removal with the desired volume of residual fluid and before air is drawn into the fluidic path 254. The geometric shape of region 220(1) and 220(2) may be adjusted to improve the accuracy of the fluid height measurement, including the shapes relative to each other. The length in the direction of needle 250 insertion, or the ratio of width to length of section 220(2) may be designed to reduce the formation of a meniscus in the boundary region between section 220(1) and 220(2).

Figure 5:
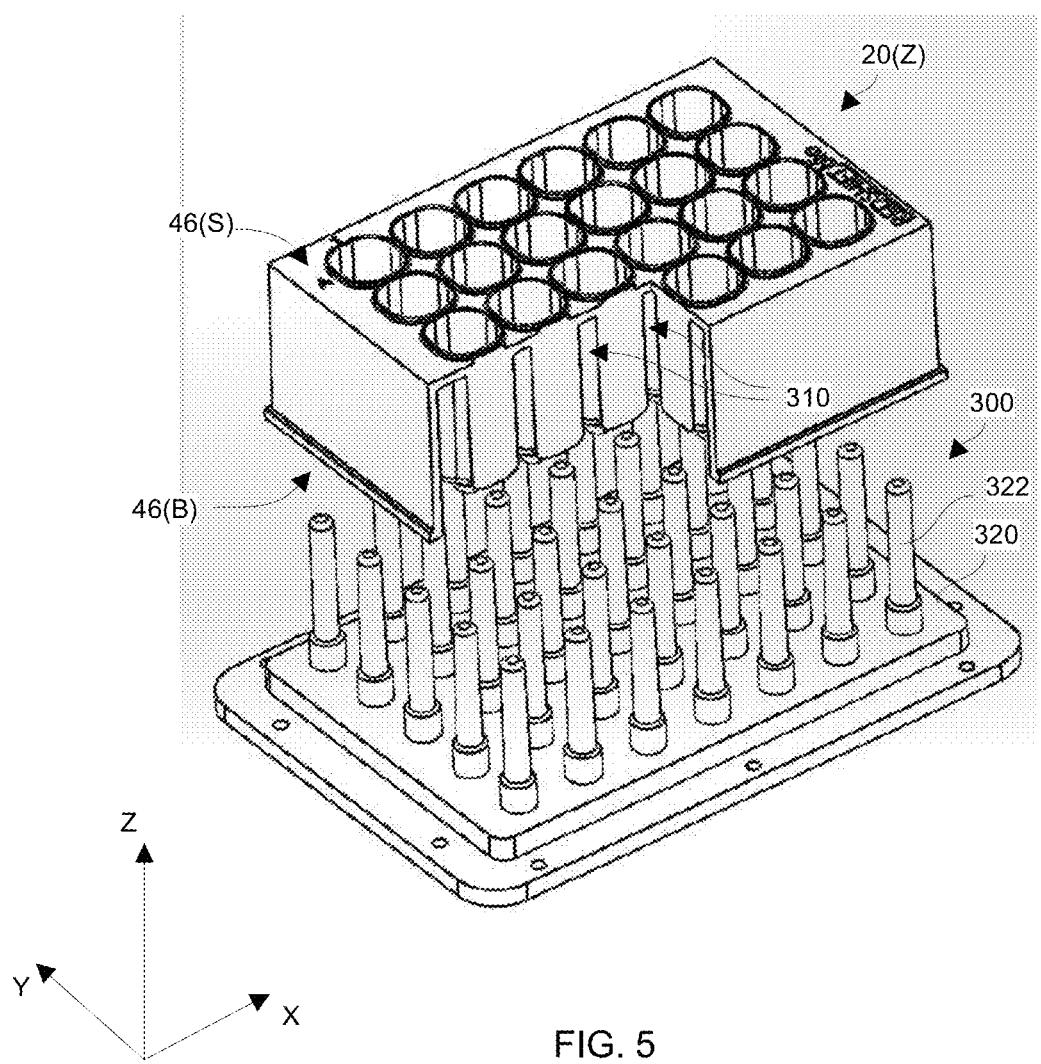
FIG. 5 is a cutaway view of another example well plate that is operative to engage with a thermal plate.
Figure 6:
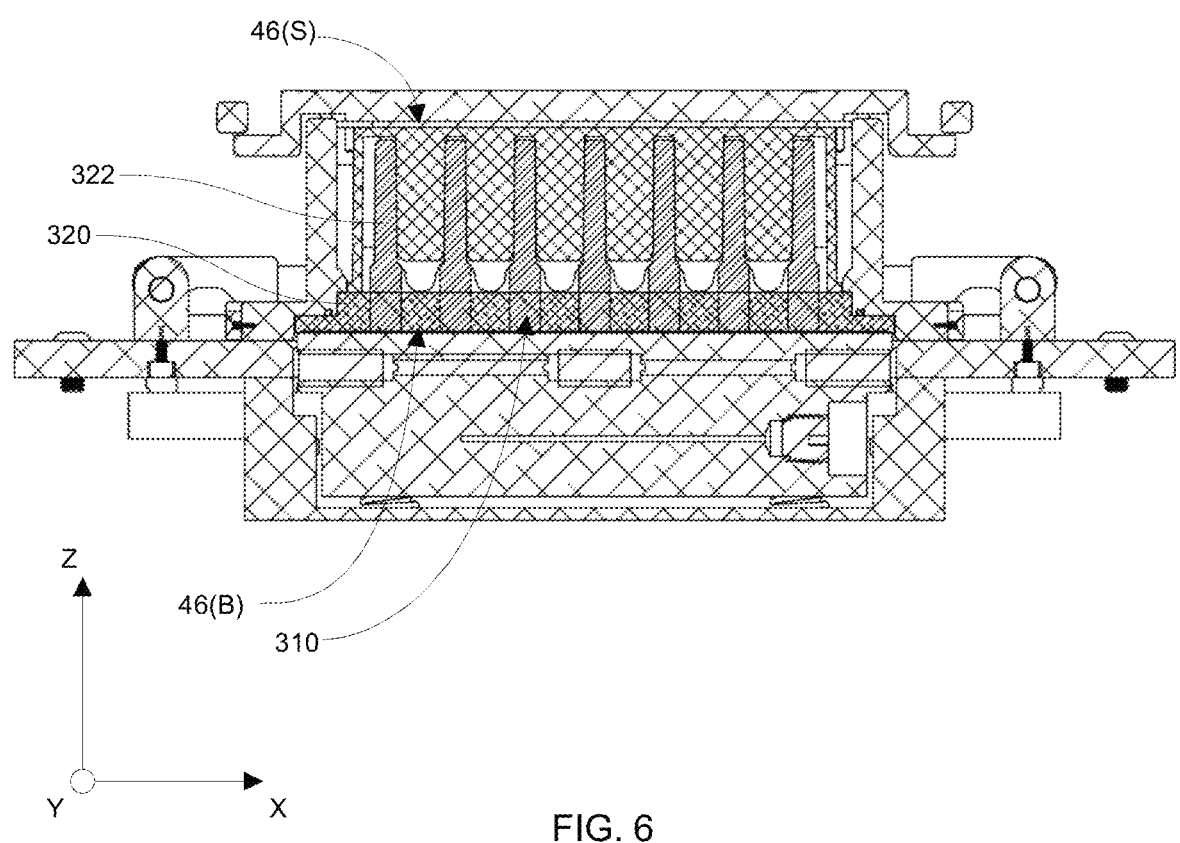
FIG. 6 is a cross-sectional side view of the well plate and the thermal plate of FIG. 5 during engagement.

FIGS. 5 and 6 show particular temperature control details in accordance with certain embodiments. FIG. 5 shows a cutaway view of an example well plate 20(Z) that is constructed and arranged to engage with a thermal plate 300. FIG. 6 shows a cross-sectional side view of the example well plate 20(Z) and the thermal plate 300 during engagement.

As shown in FIGS. 5 and 6, the geometry of the well plate 20(Z) includes recesses 310 that extend from the back side 46(B) toward the sampling side 46(S). Such recesses 310 reside between the well structures 42 defining the wells 44.

As further shown in FIGS. 5 and 6, the thermal plate 300 includes a base 320 and extending members 322 that extend from the base 320. The shape and placement of the extending members 322 operates to form efficient and effective thermal contact with the well plate 20(Z) when the well plate 20(Z) and the thermal plate 300 engage each other so that the extending members 322 of the thermal plate 300 fully insert into the recesses 310 of the well plate 20(Z).

In accordance with some arrangements, such engagement occurs while the instrumentation 22 processes the well plate 20(Z). In accordance with other arrangements, such engagement occurs while the well plate 20(Z) is not being processed (e.g., during storage of the well plate 20(Z)). In yet other arrangements, such engagement occurs during storage and processing by the instrumentation 22.

It should be understood that the various features mentioned above may exist separately or in combination within different well plates 20. Such features will now be discussed in further detail.

Artifact Detection and Well Plate Processing Based on Artifact Detection

In accordance with certain embodiments, air pressure introduced from the well plate interface 50 (e.g., a sampling head) of the instrumentation 22 may be used to pressurize a well 44 and force fluids from the well 44 up into a needle 250, the fluid then being conducted into the analytical instrument portion of the instrumentation for optical and/or other testing of fluidic parameters. In a system that tests well fluids in pairs (e.g. sample and reference fluids), it may advantageous to have a well plate 20 that provides an air or fluid channel 242 between wells 44 such that the air pressure is the same in both wells, making the two wells "inter-well paired" and a single pressurized air source may be used (also see FIG. 3) as an alternative to separate pressure controlled air sources to each independent well. Providing a channel 242 in the well plate 20 may be advantageous over creating a passage or combining the pressure source in the sampling head 50 because it enables both common and separate well pressure depending on the design of the well plate 20 and well plate sampling system, i.e. some wells 44 in a well plate 20 may be connected and some not connected, and the sampling system may have independent pressure seals and sources for each well 44 or pair of wells 44. A well plate 20 may be designed with a predetermined combination of inter-well paired wells 44 and separate independent wells 44 or pair of wells 44.

The well plate pressure may be measured by use of sensors in a gas fluidic controller or microfluidic flow control system. Alternatively, pressure sensors may be added to the gas lines to the well 44. Each well 44 may have its own gas line with separate controller 50. In one embodiment, one well 44 is pressurized, no air line is present or activated in the second well 44, the presence of the inter-well channel 242 pressurizes a second well 44, and fluid is present in the second well 44, thereby forcing fluid into the sampling system for subsequent measurement by the fluidic system as described in related art. In this manner the presence of the inter-well channel 242 may be measured without the use of pressure sensors by measuring a characteristic of the second well fluid.

In another embodiment, the sampling needle or needles 250 are pre-primed with fluid and there is no requirement for fluid to be present in the second well 44. The inter-well channel 242 then enables pressurizing of the second well 44 by increasing pressure in the first well 44, thereby forcing air into the second well needle 250, which in turn flows the needle fluid into the sampling system where the motion or other characteristic of the fluid may be measured using optical, mechanical or other methods as known in the art. Alternatively, in this embodiment, the air may displace the fluid at the point of measurement, and the absence of fluid may be used to indicate the presence of an inter-well channel 242.

In another embodiment, the inter-well channel 242 may be used to conduct fluid between channels 242, and the presence of the fluid in the second well 44 may be sensed as previously described. In one embodiment with a gas line to both wells 44, a one-way valve may be used to prevent a differential pressure between wells 44 from forcing fluid into a gas line (i.e. backflow).

In one embodiment as described the inter-well channel 242 may be on the top of the well 44, and may be in "contact" with a sealing gasket 258. In another embodiment, the inter-well channel 242 may be located between the top and bottom of the well 44. In another embodiment, the inter-well channel 242 may be formed between the well bottoms. In another embodiment the bottom the well plate 20 may also have a second well 44 opening and a seal interface for connecting the well to an external manifold, and the inter-well channel 242 may be formed in an external manifold.

The sampling head may also have a mechanism for sealing the inter-well channel 242 between wells 44, such that both individual and common pressure may be used regardless of the existence of the channel 242. The sealing mechanism may consist of a solenoid driven plunger that compresses a gasket 258 into the air channel 242 between wells 44. The sealing plate 260 (typically made of metal such as aluminum or stainless steel) may be used in combination with a gasket 258 on top of the well plate 20 to obtain a pressure seal to the well plate 20. The sealing plate 260 may contain a tab (or ridge) that presses the gasket 258 into the inter-well channel 242, thereby sealing the channel 242 and making the wells 44 independent only when the sealing plate 260 tab is present.

Various combinations of well plates with one or more inter-well air channels 242 and matching well plates 20 may then be used to provide greater flexibility in using the well plates 20. Sampling needles 250 for extracting well fluid may also contain a means to measure fluid, for example by the use of conductive leads 252 proximate to the tip of the needle 250 for measuring fluid (or air) conductivity.

Well plates 20 with inter-well channels 242 may also be characterized by the instrumentation 22 to determine which well pairs in a well plate 20 have channels 242 using the following method:
1. Connecting and sealing a sampling head with two sampling needle assemblies to the well plate 20, the sampling head having the capability of conducting gas (pressurized or vacuum) into and out of wells 44 in the well plate 20.
2. Imposing a differential pressure in the two connected wells 44. For example, pressurize only one well 44 above 1 atmosphere.
3. Measuring the pressure in at least one well 44.
4. Comparing the pressure readings in the two wells 44 or in the one well 44 relative to atmospheric pressure to determine if the pressure between the wells 44 has equalized, or increased in one of the wells 44, thereby indicating the presence of an inter-well channel 242.
5. Repeating the measurement (steps 1-4) for one or more other well pairs in the well plate 20.
6. Using the measurement of inter-well channels to identify a well plate type for further operation of the instrument.

It should be clear that the same approach would work with negative pressure, that is instead of pressure above atmosphere a vacuum or partial vacuum may be applied to a well. The location of a well 44 or more broadly, the location of channels in the well plate 20 may be used to determine a particular type of well plate 20, or well plate fluidic contents, all for determining subsequent operation of the fluidic measurement system. It should also be clear that the invention encompass alternative combinations of well pairs and channels, including, by way of example more than two wells and more than one channel as well as use the use of wells 22 designed specifically for use with channels that may be larger or smaller than wells 22 designed for holding fluids (including the use of a channel that connects directly to a port in the sampling head for pressure measurement.

The inter-well channels 242 may further be designed to have channel dimensions that restrict or impede the flow of fluid (air or liquid) between channels, thereby creating a constant or varying differential pressure between wells 44 when applying differential pressure between wells 22. When a known air pressure is applied to one well 44 and the resulting air pressure is measured in a second well 44 connected by an inter-well channel 242, the channel impedance may be calculated.

In accordance with certain embodiments, if the second well 44 has a pressure controller and the pressure controller is on (i.e. providing pressure), the controller may have difficulty detecting the artifact. If the pressure controller is off, but there is a pressure sensor, then the controller may detect a pressure rise time from pressure applied to another well 44 that is characterized for its turn-on time. In some embodiments, the controller turns the pressure off and measures at a decay rate in one or both wells 44, which will depend upon fluid volume in the wells 44. Such operation serves as an effective seal check algorithm or technique. As a result, the instrumentation 22 is able to detect whether a well plate 20 has connected channels 242, if there is a gas leak independent of the presence of channels, or through the relative volumes of gas and incompressible (relative to a gas) liquid in the wells and the decay or pressurization rate, the amount liquid or gas in wells 44

The channel impedance may be used to identify a type of well plate 20. Well plates 20 with different inter-well channel dimensions may be fabricated, and the measurement of the inter-well impedance may be used to identify a well plate 20 of a particular type. The type may include the number of wells 44 in the well plate 20, the number of interconnected well plates 20 or the well plate place of manufacture. The inter-well channels 242 thus provide a non-optical method of identifying well plate types. The well plate type used for determining future operation of a controller or fluid measurement system may be a well plate mechanical design, or it may be the contents of a particular well plate 20. The fluid volume of a well may also be used in the well plate identification measurement, wherein a known fluid volume is inserted into a well 44, and the resulting fluid level in the well 44 or volume of fluid extracted from the cell by the measurement system is used to determine a geometric shape, well depth or fluid capacity of well which is then used in determining well plate type.

The two wells 44 in a well pair may have different well volumes or different shapes with the same volume, and measurement of the cell shape or volume may be used to characterize a well plate type for future operation of the instrument. The well shape or volume may be measured using the level sensing techniques as described previously. The volume of the well 44 or liquid level in a well 44 may be measured through air pressure, by for example measuring the volume of air used to pressurize a well 44, or the rate of decay of well pressure when the source of pressurizes air is removed relative to a baseline rate of decay.

A well plate artifact (e.g. interwell channels 242) may also change before, during or after use which may aid in identifying well plates and in identifying well plates that have been previously tested by instrumentation 50. The interwell channel 242 may be formed with an interwell barrier or membrane between wells, as may be formed with a thinner layer of material in the molding of the well plate than used elsewhere to form the well plate structure 210. The interwell membrane may prevent the passage of fluid or air between wells 44 at a low pressure difference between wells 44 but may be punctured or otherwise modified at higher differential pressures between wells 44. Thus the instrumentation 50 may determine the type of well plate or whether a well plate had been previously used for fluid characterization in instrument 50 by (1) using a pressure difference to detect the absence or presence of a channel (e.g. interwell channel 242 but also another artifact) in the well plate at a first pressure differential, which may include imposing a pressure difference between two wells in the well plate;

(2) if a channel is detected, the instrumentation taking a predetermined action which may include terminating of well plate testing or continued use of the well plate;

(3) changing (e.g. increasing) the pressure differential;

(4) detecting the presence or absence of a channel at the second pressure differential;

(5) the instrumentation taking a predetermined action which may include continued testing of the well plate or termination testing of the well plate if the channel is not detected. The pressure difference at which the interwell channel is opened for the passage of liquid or air may be used to identify a well plate type. The method may include creating the channel or artifact by applying pressure to the well plate and creating a channel in the well plate wherein a liquid or gas is conducted between a source of pressurized gas and sensor for measuring pressurized gas. The method may include performing the well plate operation a second time on the well plate and when the result of the well plate type identification operation indicates that the well plate includes the artifact, preventing characterization of fluidics in the well plate.

Other mechanical or electrical artifacts that are changed by well plate use or measurement may be used in well plate identification or use. These may include an electrical resistance that permanently changes on contact with a fluid (i.e. dissolving of a conductive strip), optical detection (i.e. dissolving of a reflective strip or changing a color of a strip as known in the art). It may include measurement of whether a predetermined fluid or fluid analyte is present in a well 44, the fluid or analyte being different than used in normal fluidic characterization by instrumentation 50. It may include mechanically changing the well plate, which may include puncturing an interwell membrane using mechanical means such as motion of the needle assemblies and manifolds previously disclosed or use a mechanical plunger. Other non-optical well plate identification methods may also be used. A well plate 20 may be provided with a particular fluid in a well 44, and characterization of the fluid by the instrument, including an analyte contained in the fluid, may provide well plate identification. The level of fluid in a well 44 may be used as an identifier, different well plates 20 having different fluid levels. The inter-well channel may also be used to conduct fluids between wells 44, thereby sharing (i.e. spilling) fluids between wells 44 or equilibrating the fluid levels between the wells 44 when the fluid volume is sufficient. Injection of fluid in one well 44 and measurement in the other well 44 may be used to detect the height of the channel (i.e. barrier) between wells 44. A method of determining the inter-well barrier height may include:

1. Connecting and sealing a sampling head with two sampling needle assemblies to the well plate 20, the head having the ability to (1) inject fluids into wells 44 in the well plate 20, (2) measure the fluid level in well plates 20, or (3) both inject fluids and measure fluid levels.
2. Injecting fluid into a well 44.
3. Measuring fluid level in a well 44.
4. Comparing the fluid levels in two wells 44 to calculate the presence and spatial positioning of an inter-well fluid channel 242 between two wells 44.
5. Repeating the measurement (steps 1-4) for one or more other well pairs in the well plate 20.
6. Using the measurement of fluid level or the inter-well fluid channel 242 spatial position to identify a well plate type or for further operation of the instrumentation 22.

Furthermore, it should be understood that sensing of the fluids may be performed through a variety of methods, including DC sensing and measurement of the change in conductivity between the leads immersed in the fluid. AC methods may also be used to provide improved signal noise, including use of modulators and demodulators as known in the art.

As is well known in the art, coupling of EMI signals between antennae can be used to communicate between two physical locations. In a similar manner, leads 252 in one well 44 may transmit signals to leads 252 in a second well 44 when the leads 252 form, by way of example, an inductive loop. If an inductive loop is implemented by the means of a continuous wire loop, level sensing through conductivity may not be performed. If the loop is close by contact with a fluid, then both level sensing and inter-well signal sensing (or lack thereof) may be performed. The inter-well inductive signal between wells 44 would enable identification of a well plate type if, for example, the wells 44 are coated on the interior or exterior surface with a conductive material that shields or otherwise impedes the transmission of signals between wells 44. In other embodiments, the signaling by EMI means may occur between the lead antenna in the well to a second antenna inserted into the well plate 20 or external to the well plate 20, either by forming the leads 252 into the well plate 20 (which would require an electrical connection between antenna wires in the well plate 20 and the system), or by insertion of an antenna into the well plate 20 in proximity to the well plate leads 252, such as by replacing one or more of the cooling pins of the previous example with a loop antenna.

To those well versed in the art, sensing methods other than pressure may be used to identify a well plate type. By way of example, a conductive stripe may be placed on the top surface of the well plate, associated with each well pair. Electrical conductivity via contact to spring loaded pogo pins with an applied electrical bias in the pressure head 50 may be used to sense the presence or absence of a completed circuit. Likewise, optical sensors (a light transmitter and receiver] may also be used to sense and optional, optically reflective surface, this to identify a well plate type. In these embodiments, the sealing gasket 258 and cover 260 may have cutouts to enable detection by electrical contact or optical sensing. Alternatively, the sensors may be within the pressure seal to the needle assembly 250, 254, 256 requiring such sensors to be pressure sealed.

Level Sensing and Conductive Well Plates

Conductive level sensing is known in the art as a technique for the sensing the presence and level of a fluid in a container. A variety of level sensing methods are well known in the art including capacitive, ultrasonic, optical, float, hydrostatic, and conductive based techniques.

In accordance with certain embodiments, conductive level sensing is performed within a well 44 in a well plate 20 through the use of a pair of electrically conductive leads 252 proximate to the head of a needle 250 used to conduct fluids out of the well 44. As the needle 250 enters the fluid in the well 44, or similarly, as the fluid is drawn below the position of the conductive leads 252 as when the needle 250 is already inserted into the well 44, the conductivity between the leads 252 will change. Two end cases are thus when the leads 252 are fully immersed in the fluid or entirely exposed to air. In a liquid testing system (e.g., see FIG. 2) designed for characterizing different fluids, a wide range of conductivities and viscosities may be encountered, resulting in a wide range of conductivity values for determining the presence, absence or partial presence of fluid between the conductive leads 252. Droplet formation in contact with, or proximate to one or more leads 252 on the head of the needle 250 may further complicate the measurement.

An electrical lead 252 may be inserted into a plastic extrusion 256 such that only a limited length of the lead 252 is exposed to the fluidic (e.g., also see FIG. 3). The region where the lead 252 exits the extrusion 256 may be sealed with an epoxy or other material to prevent fluid from being trapped or traveling into the extrusion 256 by pressure differentials. The leads 252 where exposed to the fluid may be shaped, as for example on L-shape, spiral shape, etc. The two leads 252 may be separated by the needle fluidic extractive conduit or the leads 252 may be in close proximity with no separating material other than the fluid. The leads 252 may be shaped such that leads 252 are separated but intertwined, the end of the leads 252 may be parallel to each other or colinear such that the ends of the leads 252 of directly opposed.

The conductance of the fluid (and/or air) between the leads 252 is a function of multiple parameters, including the length of the exposed leads, how much of the conductive path of the leads are within the fluid or conversely in air, the volume of fluid that surrounds the leads, the shape of the fluid (i.e. the leads may be connected through a droplet that forms on the head of the needle 250 that is present even when the leads 252 are above the surface of the fluids), and the electrical characteristics of the fluid (including physical properties). The shape of the wells 44 may also be used to change the volume of fluid proximate to the conductive leads 252, such that the conductance measurement performance may be changed or improved, when for example, the fluid is being drawn past the leads as a warning that the head of the needle 250 is about to run out of fluid to extract (and thus potentially drawing air into the needle tube 254 and the instrumentation 22). The well 44 may have a large diameter at the top 220(1) and a dimple 220(2) at the bottom with a much narrower diameter (e.g., see FIG. 3). The narrow diameter at the bottom has the further advantage of making the measurement more responsive, since for a constant rate of fluid extraction, the level drops more quickly as the diameter is reduced. Other well shapes may be advantageous, including V shaped, inverted V shaped, conically shaped bottoms, hour glass shapes, etc.

In one embodiment, the leads 252 may be exposed in more than one position on the plastic extrusion 256, such that there are alternating segments of electrically exposed and unexposed leads down the length of the plastic extrusion 256. This is analogous to a multiple parallel resistances, thus providing the controller 52 multiple resistance values that depend on the number of exposed segments that are immersed in liquid or gas.

The walls 42 (at least) defining the well 44 may be electrically conductive, electrically non-conductive or partially conductive. Alternatively, conductive material may be added to or integrated with the walls 42. For example, a patterned or unpatterned conductive layer may be deposited (i.e. by evaporation or vapor deposition as known in the art) on the surface of the well 44. The presence of the conductive walls 42 may alter the electro-magnetic field lines when measuring fluid levels, thereby changing the sensitivity of the measurement of fluid levels. Unpatterned conductive layers may be deposited using deposition techniques well known in the art. Patterning of the conductive layer may be created during the fabrication of the well plate 20, which is typically through the injection molding of well plates 20 when constructed of polymer materials (e.g. polypropylene). A conductive material may also be applied through direct spraying of a conductive film, such as may be directed onto only the bottom surface or bottom dimple of a well plate). Alternately, one may use conductive inserts into or along the surface of the well plate 20. The conductive material may perform as one of the level sensing conductive paths in the system, such the level sensing current travels from lead 252 through the fluid to the well conductive material to complete a circuit.

More than two leads 252 may also be used for sensing in a single well 44. A controller 52 may be used to measure conductivity between leads before, during or after immersion in a fluid. The measured conductivity may be used to control further action by the controller, including controlling the motion or spatial positioning of the leads 252 relative to the fluid or well that may contain the fluid, the fluid extraction or rate of fluid extraction from a well 44, or rate of fluid extraction from a well 44 not containing the leads 252 (such as may be the case when simultaneous fluid extraction is performed in multiple wells 44).

For a constant rate of volumetric fluid extraction, and a well 44 that has an incremental change in volume as a function of the level of fluid in the well (i.e. for a v-shaped well, the change in volume for a given change in well height varies as a function of well height), the rate of change of conductivity may be used to determine the level (i.e. height) of fluid in the well 44. The position of the needle 250 within the well, which may be determined by mechanical means such as a drive shaft and encoder that lowers the leads 252 into the well 44 which are of known mechanical position relative to the drive shaft, may also be used to determine liquid level within well 44.

The estimated level of the fluid in the well 44 may be adjusted by the controller 52 to account for a physical property of the fluid, which may include the fluid conductivity, chemical composition (including the presence of analytes), viscosity or temperature, and a shape of the fluid in the well such as the presence of a meniscus.

A method of level sensing may include one or more of the following steps using a controller:
1. First measure a conductivity baseline between a set of leads 252.
2. Immersing the leads 252 in a fluid.
3. Measure one or more additional conductivity values between leads 252 when partially or fully immersed.
4. Comparing the first and the one or more additional conductivity values over time.
5. Creating an action when the compared result exceeds a threshold value, wherein the action may include stopping or starting the extraction of a fluid from a well 44.
6. Creating an action when the compared result exceeds a threshold value, wherein the action may include stopping or starting the extraction of a fluid from a well 44 other than the well 44 containing the immersed leads.
7. Performing steps 1-4 on a second set of leads 252, the second set of leads 252 immersed in a second fluid.
8. Comparing the conductivity values of the first and second set of leads 252 to determine a future action of the controller 52.

Well Plate Cooling

There are various conventional microplate cooling systems such as found in instruments for testing biologic materials. These systems mainly fall into three groups. The first group is for low volume dome bottomed microplates (or well plates). These microplates contact the spherical bottoms of cooling plates and require either high forces to get good thermal conduction (force physical contact) or mineral oil interfaces. The cooling plates may be temperature controlled with any one of multiple technologies, representative approaches including thermoelectric coolers, recirculating fluids temperature controlled by refrigerants, or cooling by direct exposure to a refrigerant gas.

Such cooling approaches work for low volume microplates but are not as good with higher volumes due to the low ratio of cooling contact surface to microplate well height. The high forces or the addition of mineral oils can be further draw backs in using this type of cooling plate.

The second group is used for special applications like DNA PCR thermal cycling. They use the same concept as the first group but with a different geometry that provides increased contact surfaces between the micro-plate and cooling plate (i.e. along the sides and not just the domed bottom). Enhanced thermal contact is created by the use of high forces and/or the application of mineral oil. These may have thin foil covers over the wells as known in the art.

The third group use baths. In one type the plates are sealed against a platen with cold gases or liquids which are circulated on the bottom side of the plate. Another type of bath uses water ice or dry ice and the plates are placed within the baths. Baths have the relative advantage of simplicity for samples that need to be chilled when manual analytical tools are used but add complexity for automated systems.

A limitation of the above-described conventional microplate and cooling plate systems is that they are not compatible with well plates designed for fluid extraction using pressurized wells. In contrast, for a well plate 20 that is able to withstand application of high pressure, structural strength is achieved by increasing the polymer material surrounding each well 44 in the well plate 20. This makes it far more challenging to cool the well plate 20, as the polymer material may be a thermal insulator and there is less space between wells for seating the well plate on a conductive plate as described in group 2 above, or for liquid channels without air pockets as described in group 3.

Furthermore, evaluation of analytes such as biologics may require cooling of well plates due to instability of the biologic materials or solutions at ambient temperatures over the testing period. As discussed, a common carrier used to introduce solutions to analytical or process equipment are microwell or deep well plates but these plates are difficult to cool because of the geometry and low thermal conductivity polymer materials used to fabricate the plate.

In connection with the improved well plates 20 disclosed herein, such well plates 20 may have well openings 48 on the top surface 46(S), each well opening 48 having a circular or square shape that extends down into the well 44. The well plate 20, if typically constructed from a polymer to keep it low cost, has inter-well material on the top surface 46(S) (typically flat) connecting the wells 44, which also provides structural integrity for the well plate 20. The wells 44 may be tapered, that is the cross-sectional area of the well 44 is smaller towards the bottom the well 44 (e.g., see FIG. 3). The well bottom may be flat pyramid shaped or domed. Viewing from the back side (or underside) 46(B), and in order to minimize the volume of material to fabricate the well plate 20, the wells 44 may have an air gap between the bottom and sides of the wells 44, sometimes with ribbing to provide additional structural rigidity. In order to provide adequate temperature control for samples, in for example a well plate having 96 wells 44, a thermally conductive material may be poured into the backside space between the wells 44. This material may become solid or semi-solid upon setting. This material will in effect create a heat sink or conduction path between wells 44 and a bottom surface of the well plate 20 for conducting heat between the walls 42 of the wells 44 and the cold plate 300. This arrangement avoids the problem of fitting a metal heat sink into the bottom of the well plate 20. The effectiveness of this solution depends on selecting materials that flow into the open volume between wells 44 and available and the properties of the materials for conducting heat.

In accordance with some embodiments, an array of thermally conductive extending members (or pins) 322 can be fabricated into the conductive base plate 320 (e.g. aluminum, copper). Such pins 322 will fit between the wells 44 as approached from the underside 46(B) of the well plate 44. Physical contact between the pins 322, or a conductive medium (gas or liquid) may be used to improve thermal transfer between the temperature controlled pins 322 and the well plate 20. Such pins 322 may be machined, cast, or bonded to the base plate 320. The base plate 320 temperature may be controlled via any one of multiple methods, mentioned earlier. By way of example only, existing 2 ml volume by 96 well pair plates 20 can accommodate 3 mm diameter pins 322.

Alternatively, the pins 322 may be heat pipes which are pressed into an aluminum or copper base plate. Alternatively the pins may allow for the flow of cooling air, and the air may circulate out to the top of the pin 322 proximate to top surface 46(S) and down the sides of the pin 322.

For certain arrangements disclosed herein, there is a tradeoff between direct contact as a cast material and better thermal properties of materials that are available to create a pin array.

Further Details

Figure 7:
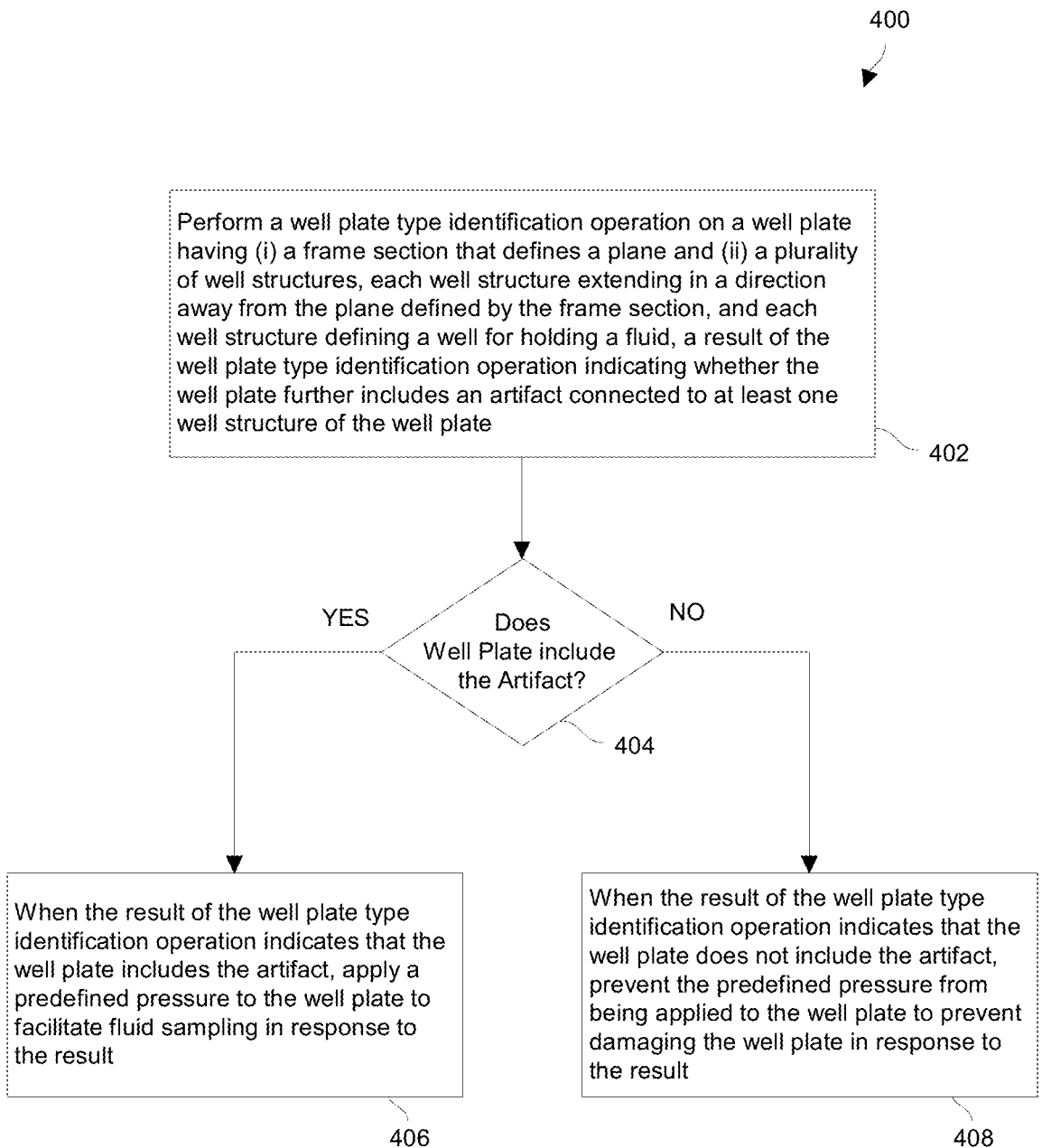
FIG. 7 is a flowchart of a procedure which is performed by instrumentation in accordance with certain embodiments.

FIG. 7 is a flowchart of a procedure 400 which is performed by instrumentation on a well plate 20 in accordance with certain embodiments (also see FIGS. 1 and 2). Such a procedure 400 enables the instrumentation to identify different well plate types as well as perform subsequent processing operations based on the identified well plate types.

At 402, the instrumentation performs a well plate type identification operation on a well plate having (i) a frame section that defines a plane and (ii) a plurality of well structures. Each well structure extends in a direction away from the plane defined by the frame section. Additionally, each well structure defines a well for holding a fluid. A result of the well plate type identification operation indicates whether the well plate further includes an artifact connected to at least one well structure of the well plate.

At 404, the instrumentation proceeds to 406 if the well plate includes the artifact. However, the instrumentation proceeds to 408 if the well plate does not include the artifact.

At 406, when the result of the well plate type identification operation indicates that the well plate includes the artifact, the instrumentation applies a predefined pressure to the well plate to facilitate fluid sampling in response to the result. Such applied pressure may facilitate removal of fluid from a well through a needle.

At 408, when the result of the well plate type identification operation indicates that the well plate does not include the artifact, the instrumentation prevents the predefined pressure from being applied to the well plate. Nevertheless, other processing may be performed on the well plate (e.g., fluid removal without pressure).

As mentioned earlier, conventional microplates include relatively thin structures to enable effective temperature transfer when put in contact with a thermal plate (e.g., to stabilize or treat materials within the shallow wells). Unfortunately, these conventional microplates with shallow wells have limitations. Along these lines, the shallow wells of these microplates are not well-suited for holding larger amounts of material (e.g., for analysis by a fluid modulation system). Additionally, the microplates are relatively fragile and may easily fail if put under pressure (e.g., by a system that provides air pressure to facilitate drawing materials from the wells).

However, as disclosed herein, improved techniques are directed to using well plates 20 with embedded artifacts 30 that enable instrumentation 22 to identify that the well plates 20 are of a particular type among other well plate types. Such identification informs the instrumentation 22 that the well plates 20 may be involved in certain types of processes that could destroy or damage other well plate types such as well pressurization to facilitate drawing of fluid from the wells 44, fluid level sensing to gauge the amounts of fluids drawn from the wells 44 and/or identify how much fluid is left in the wells 44, and so on.

While various embodiments of the present disclosure have been particularly shown and described, it will be understood by those skilled in the art that various changes in form and details may be made therein without departing from the spirit and scope of the present disclosure as defined by the appended claims.

Moreover, those versed in the art will recognize that similar designs and techniques for identification may be used in other parts of a fluidic instrument, or in other types of instruments or applications. Along these lines, a microfluidic cell may have fluidic features that provide identification of a particular cell or cell type (also refer back to the cell 112 in FIG. 2).

For example, as shown in FIG. 8, one type of cell 500 has a pathway 510 formed by two inlet channels 520(1), 520(2) (collectively, inlet channels 520) and an outlet channel 530. Optionally, the cell 500 may further include one or more additional pathways 540(1), 540(2), . . . (collectively, additional pathways 540).

In accordance with certain embodiments, cell type identification is through the geometric design of the pathway 510. In particular, one inlet channel 520(1) has a different fluidic impedance than the second channel 520(2), and the differential impedance may be detected in a fluidic measurement system (e.g. a spectrometer). When fluids are pushed or pulled through the cell 500 (for example, with a constant pressure for the first fluid in the first channel 520(1) and second fluid in the second channel 520(2)), the different channel impedance will result in different fluid velocities in the outlet channel 530. The different velocities may be measured with a flow meter as known in the art, by optically measuring particulates in the fluids, or using an optical beam to heat the fluid in the outlet channel 530, and measure the differential absorption resulting from the difference in temperature of the two fluids that in turn results from their different velocities in the outlet channel 530. One or more separate channels (or pathways) 540 may be added to the cell 500 specifically for cell identification, where the channel impedance, the resulting fluid velocity, either in absolute or relative to another channel in the cell 500, may be used for identification.

In accordance with certain embodiments, an area of each pathway 510, 540 serves as a laser interrogation region in that pathway for sensing a fluid characteristic. The arrows extending from the beam 570 in the pathway 510 illustrate the ability to move the beam 570 around the pathway 510 for identification purposes or other system operational purposes.

In a cell 500 with varying impedance in different flow paths, the flow velocities may be determined in part by pressure (i.e. extraction from a pressurized well 44). In one embodiment each flow path has a separate pressure source, and the pressure sources may be adjusted to provide the same fluidic flow rate in a channel common to both fluidic paths. A measurement of the pressure difference necessary to achieve a common velocity, or some other targeted differential flow velocity may then be used to identify a particular cell type.

The measurement of well pressure may be a static or dynamic measurement. In a dynamic measurement, the rate of change of pressure, either by applying or removing pressure from a well 44 may be used to characterize a well 44. The rate of change may be a function of the volume of air in a well 44, which may be determined by the geometric shape of a well 44, the amount of air displaced by fluid in the cell 500, or combination of both. This the rate of decay or rise in pressure may be used to type a well 44 and therefor a well plate 20 with or without an inter-well channel 242.

The following method may be used for cell identification:
1. Connecting and sealing a fluidic cell to a fluidic measurement system, the cell having first and second channels with different fluidic impedances.
2. Conducting a fluid through the first and second channels, wherein the velocity of the fluid in the first and second channel or at the outlet of the channels is different as a result of the different channel impedances.
3. Measuring a characteristic signal of the fluid in each of the two channels or in an outlet channel, the characteristic signals indicative of the fluid velocity.
4. Calculating from the two characteristic signals an absolute or relative difference signal between the channels.
5. Determining from the absolute or relative difference signal the cell identifier for use in further operation of the fluidic measurement system.

In another embodiment, the following method may be used for cell identification:
1. Connecting and sealing a fluidic cell to a fluidic measurement system, the cell having first and second channels with different fluidic impedances.
2. Conducting a fluid through the first and second channels.
3. Measuring a characteristic signal of the fluid in each of the two channels or in an outlet channel, the characteristic signals indicative of the fluid velocity.
4. Calculating from the two characteristic signals an absolute or relative difference signal between the channels.
5. Adjusting a fluidic operating parameter between channels (i.e. fluidic drive pressure).
6. Iterating steps 2-5 wherein the velocity of the fluid in the first and second channel or at the outlet of the channels achieves a targeted differential value (i.e. zero).
7. Determining from the difference in operating parameters between channels, determine a cell identifier for use in further operation of the fluidic measurement system.

The difference signal may arise from a difference in fluid temperatures. The characteristic signal may be fluid velocity, which may be determined from thermal effects or fluid arrival time among other methods. More than two channels and fluid measurements may be used in the cell identification. A single rather than multiple channels may be used, the channel having a spatially variant fluidic impedance, and the characteristic signal may be measured at different spatial positions in the channel. An optical beam 570 may be used to measure the characteristic signal. The optical beam 570 may heat the fluids, and the fluids may have a temperature dependent physical property (e.g. optical absorption), and the same optical beam 570 may be used to sense the temperature dependent physical property. The fluid velocity or differential velocity may be determined by measuring fluid arrival time at the interrogation region when fluids with different characteristics (i.e. optical absorption) are used in a single channel The impedance of the channel may vary at more than two spatial regions, and the number of unique cell identifiers may be at least $2^N-1$, where N is the number of fluid impedance differences. The same fluid may be used in both channels, different fluids in a single channel, or different fluids in multiple channels. The fluid use in determining the difference signal may be a different fluid than used in subsequent operation of the fluid measurement system.

In another embodiment of a cell with features used for identification, the identification region may be a fluid chamber with an optical path length, the optical path length different for each unique cell type. The chamber may contain a fluid or a gas. The chamber may function as an etalon, and a characteristic signal from the chamber may be an optical interference signal at one or more wavelengths. In another embodiment, a chamber may contain a fluid unique to a cell type, the fluid being measured by the fluidic measurement system to determine cell type.

A cell may be characterized or typed by measuring the position of an optimal interrogation region in the cell where the fluid optimally interacts with an optical beam to characterize a fluid A method for determining a position of an optical interrogation region with a fluid cell of a fluid analyzer, comprising
1. Defining an interrogation region with an optical beam incident on fluid within a fluidic channel within the cell.
2. Conducting in the cell channel a first fluid and a second fluid.
3. Moving the interrogation region within the fluidic channel through relative spatial positioning of the fluid channel with respect the optical beam.
4. Heating the first and second fluid in and proximate to the interrogation region through fluidic absorption of the optical beam.
5. Measuring the optical beam signal transmitted through the fluidic channel with a detector, resulting in a first signal for the first fluid in a first-time interval and a second signal for the second fluid at a second-time interval, each first and second fluid measurement pair collected at multiple spatial positions of the optical beam interrogation region within the channel.
6. Using a signal processing unit, process the first and second signals at each spatial position determine a system parameter as a function of interrogation region position.
7. Using the system parameter to determine a spatial position of the interrogation region for subsequent optimal operation of the fluid analyzer.
8. Determining from the spatial position a cell type used for subsequent operation of the analyzer.

The system parameter may be the contrast ratio between the fluids determining by dividing the first signal by the second signal. The system parameter may be the relative mixture of the two fluids in the first and second intervals. The first and second fluids may be identical fluids, and the fluids may enter the fluid cell through different input channels connected to the cell channel. The flow rates of the first and second fluids may be the same, or may be different, or may vary over time. The method above may be performed periodically, and the resulting spatial positions may be compared over time to determine if analyzer operating conditions other than interrogation region position have varied over time or the cell has been changed. Motion of the interrogation region position may be accomplished by moving an optical lens positioned to locate the optical beam in the fluidic channel or by motion of the fluidic cell. The incident beam may be positioned such that the optical beam may impinge on a side of the optical channel or other surface proximate to the channel thereby blocking a portion of the optical beam from being incident on the detector. Such modifications and enhancements are intended to belong to various embodiments of the disclosure.

What is claimed is:

1. A well plate, comprising:
   a frame section that defines a plane and comprises:
      a planar portion; and
      a set of ridge portions coupled with the planar portion, the set of ridge portions extending beyond the plane defined by the planar portion having a ridge portion diameter, each of the ridge portions having the same ridge portion diameter from the planar portion to the top of the ridge portion;
   a plurality of well structures coupled by the planar portion, each well structure extending in a direction away from the plane defined by the frame section, and each well structure defining a well for holding a fluid, the well structure comprises:
      a first section having a first section diameter, the first section diameter is the same as the ridge portion diameter;
      a second section having a second section diameter that is narrower than the first section diameter, the second section not having a conical shape;
      a boundary region between the first section and the second section, the boundary region being curvilinear to improve the accuracy of fluid height measurement in the well structure; and
      an artifact connected to at least one well structure, the artifact uniquely identifying a type of the well plate among other types of well plates.

2. The well plate as in claim 1 wherein the well plate has a sampling side and a back side;
   wherein the well defined by each well structure is inaccessible from the back side; and
   wherein the well defined by each well structure is accessible from the sampling side through a respective opening in the frame section to enable instrumentation to access that well.

3. The well plate as in claim 2 wherein the artifact includes a set of channel walls that defines a set of inter-well channels that connects at least two wells;
   wherein well plates having different geometries are processable by the instrumentation; and
   wherein the presence of the set of inter-well channels indicates to the instrumentation that the well plate has a particular geometry that is different from other geometries of other well plates that are processable by the instrumentation.

4. The well plate as in claim 3 wherein the set of channel walls defines, as an inter-well channel, a passage that connects a first well defined by a first well structure and a second well defined by a second well structure;
   wherein the passage provides pressure equalization between the first well and the second well when a first opening in the frame section to the first well is sealed, a second opening in the frame section to the second well is sealed, and a pressure change is applied by the instrumentation to one of the first well and the second well.

5. The well plate as in claim 3 wherein the set of inter well channels forms a unique channel pattern within the well plate that is different from those of the other well plates, the unique channel pattern being detectable by the instrumentation.

6. The well plate as in claim 2 wherein the artifact includes sample material residing in wells defined by a well structure;
   wherein well plates having different geometries are processable by the instrumentation; and
   wherein the presence of the sample material residing in the well indicates that the well plate has a particular geometry that is different from other geometries of other well plates that are processable by the instrumentation.

7. The well plate as in claim 6 wherein the sample material resides in a set of wells defined by a set of well structures wherein the material fills a first well to a first fluid height and that the material fills a second well to a second fluid height; and
   wherein the first fluid height and the second fluid height indicate that the well plate has a particular geometry that is different from other geometries of other well plates that are processable by the instrumentation.

8. The well plate as in claim 6 wherein the presence of the sample material residing in well defines a unique fluid height pattern within the well plate that is different from those of the other well plates, the unique fluid height pattern being detectable by the instrumentation.

9. The well plate as in claim 8, further comprising:
   conductive material in contact with the well structure to enable the instrumentation to perform fluid level sensing of the fluid filling the well to a unique set of fluid heights.

10. The well plate as in claim 9 wherein a first portion of the conductive material is in contact with sample material within a particular well defined by a particular well structure;
    wherein a second portion of the conductive material is out of contact with the sample material within the particular well defined by the particular well structure;
    wherein the instrumentation includes a first conductive lead and a second conductive lead enabling the instrumentation to detect a conductive pathway through the sample material and the conductive material when the first lead inserts into the particular well through a respective opening in the frame section to contact the sample material within the particular well and the second lead directly contacts the second portion of the conductive material.

11. The well plate as in claim 8, wherein:
    the section is a first section;
    the section diameter is a first section diameter;
    a well defined by a well structure includes (i) the first section having the first diameter and (ii) a second section having a second diameter that is narrower than the first diameter; and
    wherein, when the well contains fluid, the fluid height changes at a first rate within the first section when the instrumentation draws fluid from the particular well at a constant speed and at a second rate that is faster than the first rate when the instrumentation draws fluid from the well at the constant speed.

12. The well plate as in claim 2, further comprising:
    a set of containing walls coupled with the frame section, the set of containing walls defining a well plate bottom and a containing space between the plurality of well structures and the well plate bottom.

13. The well plate as in claim 12, further comprising:
    thermally conductive material disposed within the containing space defined by the set of containing walls, the thermally conductive material being constructed and arranged to transfer heat between the plurality of well structures and the well plate bottom defined by the set of containing walls.

14. The well plate as in claim 2 wherein the plurality of well structures defines a set of recesses to receive, on the back side of the well plate, a set of extending members of a thermal control apparatus.

15. The well plate as in claim 14 wherein each extending member of the thermal control apparatus projects along an axis; and
    wherein the plurality of well structures defines, as the set of recesses, elongated cavities to receive respective extending members of the thermal control apparatus when the well plate and the thermal control apparatus are moved toward each other along the axis.

16. The well plate as in claim 2 wherein the frame section includes the set of ridge portions being operative to form a pressure seal with a gasket of the instrumentation.

17. The well plate as in claim 16 wherein the set of ridge portions include ridge portions that encircle individual openings in the frame section.

18. The well plate as in claim 1, wherein the second section is substantially cylindrically-shaped and has a concave end.

\* \* \* \* \*